United States Patent Office 3,282,673
Patented Nov. 1, 1966

3,282,673
HERBICIDAL COMPOSITIONS AND METHODS
Arthur E. Pflaumer, P.O. Box 309, Norristown, Pa.
No Drawing. Filed Sept. 26, 1963, Ser. No. 311,647
18 Claims. (Cl. 71—2.6)

This application is a continuation-in-part of copending application Serial Number 204,063, filed June 21, 1962, now U.S. Patent 3,206,485.

This invention relates to:

(a) herbicidal compositions containing herbicidal acids, or amine salts or amides thereof, dissolved in liquid hydrocarbons, and (b) methods for the preparation of these new materials.

FIELD OF INVENTION

Herbicides are now used in large quantities for controlling the growth of vegetation. For example, they are used to eradicate weeds from the sides of highways and from railroad right-of-ways. Great amounts of these materials are also used to control the growth of weeds on lands cultivated with cereal grains or other economic crops.

Herbicidal compositions also are being used in large amounts for controlling weeds in lawns of individual homes and industrial or recreational institutions, e.g., golf courses, parks or the like.

Herbicides have acquired an important place in the field of agricultural chemicals because of the effective job they can do of reducing or eliminating growth of weeds or other undesirable vegetation. However, although the general idea of using herbicidal materials for vegetation growth control is a good one, it creates a number of troublesome problems when herbicidal monocarboxylic acids are used as the growth control agent. For example, the herbicidal acids per se are not soluble in water or other inexpensive solvents, and it has been necessary to attempt use of derivatives of the acids which have reasonable water or solvent solubilities to permit the herbicidal agent to be spread over the growth area. Water-soluble salts of the acids, however, are generally unsatisfactory because such salts are so easily washed off the treated plants or leached from the soil after application.

Another problem which has been experienced in the past has been the tendency of herbicidal sprays to drift. These sprays may be a solution of herbicidal acid ester in fuel oil emulsified with water to give an oil-in-water emulsion, or they may be a water-soluble derivative of the herbicidal acid to give a solution. These sprays are usually very thin and have a tendency to form spray particles of minute size which often drift to areas where the herbicidal treatment is detrimental. The problem of drifting is most serious when low flying airplanes or helicopters are used for applying the spray.

Herbicidal agents must be applied in relatively diluted form or be spread very thinly in order to reduce costs and also to prevent damage to desirable valuable crops where they are used for the control of weeds in cultivated crops. Effective spreading of the herbicide is accomplished by suitable dilution of the herbicidal agent which, as previously indicated, is preferably water-insoluble. Dilution can be accomplished by the use of cheap hydrocarbon solvents such as diesel oil, kerosene or the like, but such solvent solutions, particularly when applied over large areas, may be unsatisfactory because of the "drift" characteristics of such solvent solutions. This has lead to the development of emulsion systems for providing necessary dilution of the active herbicidal agent and satisfactory spreading of the material over the growth area to be treated. Thus, if herbicidal materials are properly incorporated into water-in-oil emulsions that have proportions of ingredients to form emulsions having a viscosity high enough to approach the consistency of salad dressing or mayonnaise, such emulsions can be dispersed upon vegetated areas by dropping or projecting the emulsion onto a disc rotating at high speed. This "sling-spray method" of spreading is currently used and approved by many areas for herbicide application. The particle size of the sling-sprayed herbicide is relatively large and descends quickly to the desired area of application mitigating the drift problem.

Considerable research and development work has been conducted with a view to providing new and improved herbicides. This has lead to the production of a wide variety of different forms of herbicidal materials. There are, for example, alkanolamine salts of herbicidal acids (see U.S. 2,515,198), complex alkanolamine esters of herbicidal (see U.S. 2,771,477), salts of herbicidal acids with polyamino compounds (see U.S. 2,519,780 and U.S. 2,843,471), and certain water-insoluble salts of herbicidal acids with aliphatic amines (see U.S. 2,900,411). These represent only a small portion of a multitude of various forms of herbicidal compositions, a majority of which have never attained any commercial importance and a few of which have been actually sold commercially. So many different forms of herbicides have been developed which are based upon herbicidal acids, the agricultural industry and related groups dealing with these products have developed a standard term for designating the herbicidally active content of a composition, namely, the "pound-gallon." This term means the amount of actual herbicidal acid or a quantity of agent necessary to provide the equivalent thereof in a particular composition. A "two pound-gallon" means a herbicidal composition which contains two pounds of herbicidal monocarboxylic acid, or the larger quantity of a derivativte of the acid necessary to provide the equivalent of two pounds of the acid in each gallon of the composition. The industry has also generally now accepted diesel fuel or equivalently cheap solvent as the diluent, in addition to water, economically suitable for use in herbicidal compositions, with the possible exception of special consumer products which are able to sustain the use of more costly diluents or other ingredients.

OBJECTS

A principal object of the invention is the provision of new improvements in herbicidal compositions that may be mixed with water to form viscous water-in-oil emulsions to be used in the control and growth of vegetation. Further objects include:

(1) The provision of herbicidal compositions comprising certain water-insoluble salts that dissolve in diesel fuel, or similar hydrocarbon solvents, as a brilliantly clear solution containing a relatively high degree of active herbicidal material, e.g., at least a one pound-gallon and advantageously, at least a two pound-gallon.

(2) The provision of herbicidal compositions that can be made and sold at low cost relative to their active herbicide content because they do not include expensive solvents, emulsifiers or other additives.

(3) The provision of herbicidal concentrates in which the herbicidal material is present as a salt that functions as an emulsifying agent to cause the concentrate to form W/O emulsions when mixed with water.

(4) The provision of herbicidal concentrates which may be easily mixed with water in the field to form viscous W/O emulsions that may be applied by the sling-spray technique.

(5) The provision of new methods for making herbicidal products from herbicidal acids and of solubilizing the acids in hydrocarbon solvents.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by making liquid herbicidal compositions from a herbicidal monocarboxylic acid and a liquid hydrocarbon having a boiling point above about 150° C., e.g., kerosene or diesel fuel, in which the herbicidal acid is insoluble by solubilizing the herbicidal acid in the liquid hydrocarbon by one of several ways, namely:

(a) By combining the free herbicidal acid with an amide of an alkylene polyamide and a monocarboxylic acid containing between 2 to 24 carbon atoms, (b) By forming a salt of the herbicidal acid with an amide of an alkylene polyamine and a monocarboxylic acid containing between 6 to 24 carbon atoms, or (c) By using the herbicidal acid as the amide of an alkylene polyamine, particularly as a polyamide, one amide group of which is from the herbicidal acid and the other from a fatty acid.

An example of embodiment (a) is the use of the diamide of tall oil fatty acids and ehtylene diamine to dissolve trichlorophenoxy acetic acid in large amount at temperatures above the liquefication point of the diamide, i.e., about 50° C., with the resulting solution of herbicidal acid in diamide being soluble in warm diesel fuel even though virtually none of the herbicidal acid by itself would be soluble in the warm diesel fuel.

By way of example of (b), a preferred class of salts of herbicidal acid and amide of an alkylene polyamine and a monocarboxylic acid are the salts represented by the following formula:

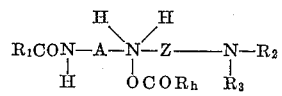

wherein:

$R_1$ is an alkyl, alkenyl, cycloalkyl or aryl radical of 5 to 23 carbon atoms, $R_2$ is hydrogen or $R_4CO$—

$R_3$ is hydrogen or alkyl or alkenyl of 1 to 20 carbon atoms, $R_4$ is an alkyl, alkenyl, cycloalkyl or aryl radical of 5 to 23 carbon atoms which may be the same as $R_1$ or which may be $R_h$, A is alkylene, cycloalkylene or arylene, particularly 2–6 carbon alkylene, cyclohexylene and phenylene, $R_h$ is the radical of a herbicidal acid, particularly aryloxyalkane monocarboxylic acids, and Z is a divalent organic radical selected from the group —A— or

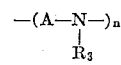

where $n$ is a positive integer 1 through 6.

In those cases where $R_2$ is hydrogen, the corresponding nitrogen atom may have a valence of five and involve a second salt group with $R_1COOH$ or $R_hCOOH$.

By way of example of (c), there is the use of amides of the formula:

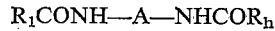

or the use of amides of the formlula:

wherein $R_1$, $R_h$, A and Z have the meaning as defined above.

The success of the present invention is due, in part, to the discovery that the amides and the herbicidal salts as described function as solvents for free herbicidal acids which are otherwise insoluble in liquid hydrocarbons. This solvent function makes it possible to create herbicidal compositions having a very high active ingredient content, i.e., herbicidal concentrates containing 2 to 4 pounds of active herbicidal acids or equivalent per gallon of liquid can be prepared.

Yet another discovery of this invention is the fact that the amides or herbicidal salts per se serve as emulsifying agents to form water-in-oil emulsions. Hence, when mixed with diesel fuel or other hydrocarbon solvents and/ or free herbicidal acids, the resulting products can be mixed with varying amounts of water to give W/O emulsions. As is known in the art, the greater ratio of water to oil in such emulsions, the higher the viscosity. It is possible with these material to employ such relatively high proportions of water that final, stable emulsions are formed which have a semi-solid consistency comparable to salad dressing or mayonnaise.

A still further advantage noted for the new herbicidal salts is their extremely low volatility and substantial absence of any drifting when their water-in-oil emulsions are used to control growth of vegetation in areas adjacent to sensitive crops.

EXAMPLES

A more complete understanding of the new herbicidal compositions and methods of preparation may be had by reference to the following reports of data obtained by actual operations of the invention in which all parts and percentages reported are by weight unless otherwise specified.

Example 1

The example concerns formation of a herbicidal composition from a salt of tall oil fatty acid amide of diethylene triamine and trichlorophenoxy acetic acid.

Diethylene triamine (103 parts) was mixed with 570 parts of tall oil fatty acid and the mixture was reacted in a flask equipped with a fractionation column having a reflux until the temperature reached 220° C. and about 36 parts of water had been removed.

The reaction product in the still pot upon cooling to room temperature (20° C.) was a reddish viscous liquid which would become an opaque paste if the temperature was reduced to about 5° C. The resulting product was virtually insoluble in water, i.e., its solubility in water at 20° C. was 0.012%.

The reaction proceeds according to the following equation:

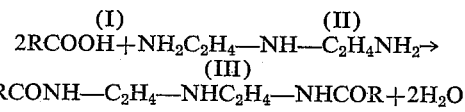

The resulting 637 parts of fatty amido amine was reacted with 255 parts of trichlorophenoxy acetic acid by warming a mixture of the two materials together at 100° C. for about one hour. The resulting salt was a clear, viscous liquid which remained clear even when cooled to 0° C. The salt forming reaction proceeds according to the following equation:

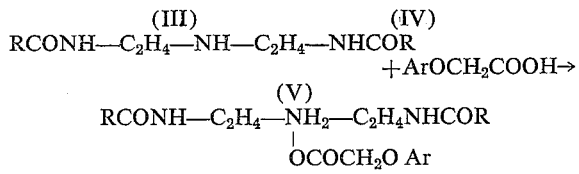

In other cases, the neutralization of (II) was conducted successfully at temperatures between 40° and 100° C. At temperatures as low as 20° C., the mixture could not be stirred adequately because of the viscosity and occluded air could not escape. To determine the exact point where the amine group is just neutralized in accordance with the foregoing equation is difficult since the end-point is not readily apparent. An excess of neutralizing herbicidal acid, however, is not detrimental to the preparation of herbicidal compositions since the extra free acid dissolves in the salt product and increases the active herbicide content of the resulting product.

The salt (V), 84 parts, was diluted with 20 parts of diesel fuel to give a clear solution containing 2 pounds per gallon of trichlorophenoxy acetic acid for use as a herbicidal concentrate. A portion of this concentrate was diluted with an equal volume of diesel fuel and while the resulting solution was vigorously stirred with a motor-driven propeller-type stirrer, 2 volumes of water were added streamwise to it to form a stable W/O emulsion. The emulsion when formed was found to have a viscosity at 20° C. of about 4600 centipoises.

*Example 2*

Use of amido amine salt as solvent for herbicidal acid.

To the salt (V) of Example 1, 890 parts, there was added an additional 250 parts of trichlorophenoxy acetic acid and the mixture was stirred for about 15 minutes at 50° C. until all of the acid had dissolved in the liquid. The resulting solution was found to be soluble in diesel fuel and to be useable in forming W/O emulsions in the same manner as set forth in Example 1.

*Example 3*

The fatty amido amine (III) of Example 1, 96 parts, was mixed with 128 parts of 2,4,5-trichlorophenoxy acetic acid and stirred at 100° C. for 2 hours. Upon cooling to about 20° C., a viscous clear reddish liquid (VI) was obtained. This solution was found to be miscible in all all proportions with diesel fuel to give clear viscous to thin liquids depending upon the amount of diesel fuel mixed with the viscous liquid. Water added to the diesel fuel solutions containing as little as about 10% by weight of the product (VI) readily emulsified with adequate mixing to give W/O emulsions.

*Example 4*

This example concerns preparation of herbicidal compositions from a salt of tall oil fatty acid amides of triethylene tetramine and dichlorphenoxy acetic acid/trichlorophenoxy acetic acid mixture.

Triethylene tetramine, 146 parts, was heated in distillation apparatus, similar to that described in Example 1 having an agitator in the still-pot, with 600 parts of tall oil fatty acids. By the time the still-pot temperature had reached 220° C., 36 parts of water had been removed overhead. The product (VII) remaining in the still-pot was allowed to cool to room temperature and was found to be a viscous red-brown liquid. A mixture of equal parts of 2,4-D and 2,4,5-T (235 parts) was mixed with 710 parts of product (VII) and heated for about one hour at 100° C. with stirring. Upon cooling to 20° C., a thick, sticky mass was obtained which was soluble in diesel fuel to an extent that at least 50 parts of (VII) dissolve in 50 parts of diesel fuel to give a clear liquid. This 50% solution in diesel fuel readily emulsified at least an equal weight of water to give a viscous W/O emulsion.

*Example 5*

The example concerns preparation of a herbicidal composition from a salt of soya oil fatty acid amide of ethylene diamine and trichlorphenoxy acetic acid.

Soya oil (885 parts) was charged into the still-pot of apparatus as described in Example 4, 234 parts of ethylene diamine were added, and with the mixture gently agitated, it was heated to reflux. After heating for 2 hours with continuous reflux, the still-pot temperature was about 220° C. The contents of the still-pot were then cooled to 100° C. and washed twice with boiling water. Finally, the product (VIII) was dehydrated by heating to 130° C. until the material appeared to evolve no more steam. Upon cooling to about 20° C., the product was a soft pasty mass.

Trichlorophenoxy acetic acid (230 parts) was mixed with 324 parts of product (VIII) and the mass was heated to 100° C. for one hour. The resulting salt was a clear liquid at 50° C. and soluble in at least equal parts by weight in diesel fuel at that temperature to give a clear solution. Upon cooling to 20° C., the solution became clouded by precipitation of insoluble product.

Oleic acid (10 parts) was dissolved at 50° C. in 100 parts of the diesel fuel solution of product (VIII). Upon cooling this solution to room temperature, i.e., about 20° C., it remained clear. A W/O emulsion made from the diesel fuel solution without the added oleic acid was more viscous than a W/O emulsion made from the same proportions of water and the diesel solution containing the oleic acid.

*Example 6*

The diamide of tall oil fatty acid and ethylene diamine was prepared from the following:

| | Gms. |
|---|---|
| Ethylene diamine (98%) _____(2 mols)__ | 123 |
| Tall oil fatty acids _____do____ | 570 |

The two reactants were charged into a flask equipped with a distillate condenser and an internal stirrer. The mixture was heated with agitation for 2 hours at 220° C., during which time approximately 2 mols of water and one mol of ethylene diamine distilled over from the flask into a receiver. The resulting diamide was a clear brown viscous liquid at above about 50° C., but solidified upon cooling to room temperature (20° C.).

This diamide was found to dissolve as much as an equal weight of trichlorophenoxy acetic acid when liquid (heated above the liquefication temperature, i.e., above about 50° C.), but the solution solidified upon cooling to room temperature with indication of separation into an acid phase and an amide phase. The heated solution of acid in amide (50:50) is soluble in as little as an equal part by weight of diesel oil, but clouded upon cooling to room temperature.

This example shows that the relatively low molecular weight amides have solvating powers for the herbicidal acids, but are restricted in their use for making herbicidal solutions by temperature limits.

*Example 7*

This example concerns the fatty acid salt of monoamide of ethylene diamine and a herbicidal acid.

The following ingredients were used:

| | Gms. |
|---|---|
| Ethylene diamine (98%) _____(1 mol)__ | 61 |
| Tall oil fatty acid _____do___ | 285 |
| Trichlorophenoxy acetic acid _____do____ | 256 |
| Hydrocarbon oil of boiling range 225-325° C. ____ | 200 |

The hydrocarbon oil was used to reduce the mixture viscosity and steam-distill water of amidation.

The mixture was heated to 150° C. with agitation while 18 cc. of water were distilled out of the reaction flask. The product was a viscous clear liquid at the reaction temperature, but became a mushy solid at room temperature. It was soluble when heated (50° C.) in diesel fuel. Since the herbicidal acid is much stronger than the fatty acid, the product is the monoamide of TCPAA and the salt of the fatty acid.

*Example 8*

This example concerns the diamide of ethylene diamine in which one amide group is from a herbicidal acid and the other amide group is from a fatty acid.

The same mixture as in Example 7 was heated to 200° C. until 2 mols of water were eliminated. This gave as a reaction product the diamide, with one amide group from TCPAA and the other from tall oil fatty acid.

The product was a pasty solid at room temperature that melted at about 120° C. to a clear viscous liquid. It completely dissolved at 120° C. in an equal weight of kerosene.

*Example 9*

This example concerns an amino diamide made from herbicidal acids which is transformed into a salt of a fatty acid and then used in preparation of herbicidal compositions in accordance with the invention.

The following reactants were charged into a reaction flask equipped with internal stirrer and distillate condenser:

| | Gms. |
|---|---|
| Trichlorophenoxy acetic acid | 256 |
| Dichlorophenoxy acetic acid | 222 |
| Tall oil fatty acid | 300 |
| Hydrocarbon solvent (Atlantic #300 process oil) | 400 |
| Diethylene triamine (98%) | 103 |

The mixture was heated to 185° C. for 2 hours, during which time 36 gms. of water were recovered as distillate. The resulting product was a clear viscous solution comprising the hydrocarbon oil as a solvent. Since the herbicidal acids are much stronger acids than the fatty acid, the product is a diamide of the herbicidal acids and the salt of the fatty acid having the formula:

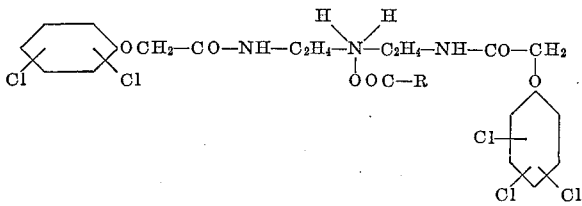

On cooling to room temperature the viscous solution became an opaque paste. At 50° C., the product dissolves in an equal weight of diesel oil to give a brilliantly clear solution. This solution is a herbicidal concentrate that may be diluted with further diesel oil and mixed with water to form W/O emulsion of varying water to oil ratios dependent upon the dilution desired and the final viscosity desired.

*Example 10*

This example concerns herbicidal compositions made of a diamide comprising a non-hebicidal aromatic acid.

The following reactants were charged into a flask as described in Example 9:

| | Gms. |
|---|---|
| Diethylene triamine (98%) | 103 |
| Tall oil fatty acid | 300 |
| Benzoic acid | 122 |

The mixture was heated at 215° C. for about two hours, during which 36 gms. of water were removed. The resulting product was light brown viscous liquid. Forty-five grams of the product would easily solubilize 30 gms. of TCPAA in 75 gms. of diesel oil. When water is added streamwise to this solution, it easily emulsifies as a W/O emulsion. On the other hand, the addition of 2% of a water-soluble surfactant to the water, e.g., "Triton X100," a condensation product of p-tertiary butyl phenol and ethylene oxide, gives an O/W emulsion. Either emulsion constitutes a herbicidal composition within the scope of the invention, but the O/W type product is preferred for sling-spray application.

DISCUSSION OF DETAILS

It is apparent from the general description of the invention that a wide variety of amidoamine compounds may be used to produce the new herbicidal compositions. However, certain specific compounds and classes of compounds give especially good results and are preferred, e.g., amides of polyalkylene polyamines containing 1 to 6 alkylene groups having 2 to 4 carbon atoms and $N+1$ amino groups where N is the number of alkylene groups with a monocarboxylic acid containing 6 to 24 carbon atoms, typically, diethylene triamine with a 12–18 carbon atom fatty acid.

Examples of useable monoamides include oleoyl diethylene triamine; behenyl dipropylene triamine; stearoyl triethylene tetramine; tall oil fatty acid amide of triethylene tetramine; cotton seed oil fatty acid amide of dicyclohexylene triamine; benzoyl diethylene triamine; caproyl tributylene tetramine; toluyl diethylene triamine; toluyl p-phenylene diamine; oleoyl di-p-phenylene triamine; tall oil fatty acid amide of ethylene diamine; diethylene triamine naphthenate, benzoyl cyclohexylene diamine; hexahydroterephthalyl diethylene triamine; $N_1$-capryl, $N_3$-dodecyl diethylene triamine; $N_1$-benzoyl, $N_3$-butenyl diethylene triamine and lauroyl diethylene triamine. In addition to use of commercial mixtures of acids such as tall oil acids, rosin acids, naphthenic acids in formation of any of the amides used in this invention, other commercial acids such as neo acids made by the Koch process, e.g., "Versatic Acids," are useable.

Examples of useable diamides include dioleoyl diethylene triamine; tall oil fatty acid diamide of triethylene tetramine; dicaproyl tributylene tetramine; $N_1,N_3$-dibenzyl, $N_3$-hexyl diethylene triamine; $N_1,N_3$-distearoyl, $N_4$-ethyl tripropylene tetramine; cotton seed oil fatty acid diamide of dihexylene triamine; diethylene triamine dinaphthenate; disylvoyl diethylene triamine; dihexahydroterephthalyl dicyclohexylene triamine; $N_1,N_3$-dilauroyl diethylene triamine; dioleyl ethylene diamine and the amides of polychlorophenoxy acetic acid with a monoamide as mentioned in the preceding paragraph.

Mixtures of two or more of the amidoamine compounds may be used to react with herbicidal acids in accordance with the invention.

Various herbicidal acids may be reacted with the amidoamines to form the herbicidal salts, but aryloxyalkane monocarboxylic acids are preferred, particularly 2,4-dichlorophenoxy acetic acid and 2,4,5-trichlorophenoxy acetic acid. Other useable herbicidal acids include phenoxyacetic acid; 1-naphthoxyacetic acid; 2-naphthoxyacetic acid; 4-chlorophenoxy acetic acid; 4-chlorophenoxypropioxyacetic acid; 2,4-dimethylphenoxyacetic acid and other chlorophenoxy) acetic acid; 4-bromophenoxyacetic acid; 4-fluorophenoxyacetic acid; 2-chloro, 4-bromophenoxy acetic acid; 2-methyl, 4-chlorophenoxyacetic acid; 2,5-diethyl, 4-chlorophenoxyacetic acid; 5,7-dichloro-α-naphthoxyacetic acid; 2,4-dimethylphenoxyacetic acid and other herbicidal haloaryloxy monocarboxylic acids such as mentioned in U.S. 2,446,836. Mixtures of 2 or more of these acids may be used to form salts with the amidoamine compounds.

In forming herbicidal salts, 1 mol of the herbicidal acid will react with each soft forming amino group present in the amidoamine compound. As seen in Example 1 above, this can be one mol of acid per mol of amidoamine compound or the ratio may be greater as with a monoacyl polyalkylene polyamine. Further, the full stoichiometric proportion of herbicidal acid need not be used, in which case a mixture of the amide and the amide salt will be obtained. On the other hand, since the salt acts as a solvent for the herbicidal acid, more than the full stoichiometric proportion may be used, in which case a solution of the acid in the salt may be obtained. As a general rule, between about 0.5 to 3 mols of herbicidal acid per amino group can be used and advantageously 0.8 to 2 mols per amino group are employed. Normally the higher mol ratios are preferred since this forms products having desirable high active herbicide content. Thus, the more herbicidal acid in the product and the less proportion of amidoamine, the more potent the resulting herbicidal composition per unit cost of ingredients.

Various temperatures and other conditions may be used in forming the new salts, e.g., 40° to 150° C. may be used to produce salt formation between the acid and amidoamine compound. However, the resulting compound generally are quite viscous and it has been found advisable to use a temperature of about 80° to 120° C. so that the mixture will be fluid enough to be properly agitated.

The new herbicidal salts, with added herbicidal acid dissolved in the salts, are soluble in a wide variety of readily available, inexpensive solvents, e.g., liquid hydrocarbons having an initial boiling point above about 100° C., and advantageously above about 150° C. of course, most commercial hydrocarbon solvents having a boiling range, e.g., 165°–300° C., and an initial boiling point of about 100° C. is indicated so that use of highly volatile solvents which may present a fire hazard will be avoided. These herbicidal products can be dissolved in diesel fuel, kerosene, methyl naphthalene, fuel oil, turpentine, xylene, Stoddard solvent, V.M. & P. naphtha, chlorinated kerosene and the like. Even lower boiling liquid hydrocarbons can be use if desired. Extremely high boiling solvents, e.g., final boiling point of 400° C., may be used since the evaporation of the solvent after application does not appear necessary for effective use of the herbicide.

Such solutions can be used directly as herbicides for application to vegetated areas to control plant growth. Accordingly, the proportion of active herbicidal product relative to the solvent may be varied and will depend to some extent upon the particular manner in which the heribicidal composition is to be employed. Where a concentrate consisting of a solution of the herbicidal product in a solvent is desired for mixing with water or additional solvent in the field at the point of use, solutions containing between about 1 and 5 lbs. of herbicidal product dissolved in each gallon of solution are recommended.

The preferred herbicidal concentrates of this invention are completely soluble in kerosene and solutions in kerosene can be used without resort to emulsification. Alternatively, the herbicidal amides or amine salts may be emulsified, without any added kerosene, to give good W/O emulsions. The herbicidal amides or amine salts may also be formed into O/W emulsions using suitable emulsifying agents, with or without added inert solvents.

The herbicidal amides and salts of this invention may be mixed with other herbicidal products if desired for the preparation of special formulations. For example, solutions of these salts in suitable solvents may contain herbicidal esters such as the alkanol esters, glycol esters, or other esters of 2,4-D and 2,4,5-T. Such special formulations may also include, if desired, surface active agents, spreading agents, photochemical catalysts (see U.S. 2,446,836) or the like.

Herbicidal salts in accordance with this invention may be formed from monoamides of polyamines or from polyamides of polyamines which contain at least one salt-forming amino group. It has been found that herbicidal salts formed from the polyamides, particularly the diamides, give perfectly clear solutions in diesel fuel and similar hydrocarbons to yield brilliantly clear solutions. On the other hand, herbicidal salts formed from the monoamides, in some cases and particularly with amides of low molecular weight acids, may not give brilliantly clear solutions in diesel fuel. It has been found that by mixing a little free fatty acid with the resulting herbicidal salt of the monoamide, the resulting mixture has high solubility in diesel fuel and related solvents and will give brilliantly clear solutions. Fatty acids, typically those having 6 to 24 and especially 10 to 18 carbon atoms are most useful for this purpose. The herbicidal acids as previously mentioned may also be used with less effectiveness for this purpose. Also, other acids which may be employed in forming amidoamine compounds from polyamine compounds, typically polyalkylene polyamines, polycycloalkylene polyamines and polyarylene polyamines, as listed above, are contemplated for use in this manner. Such acids include benzoic, tolulic, hexahydroterephthalic, sylvic, naththenic, 2-naphthoic and comparable acids. The acid may be added to the amidoamine compound before or after the salt forming step with the herbicidal acid. Of course, if added before and under conditions to evolve water, amide formation may ensue between the amine groups of the amidoamine compound and the free acid reducing the salt forming capacity of the compound. As a general rule, between about 0.01 and 1 mol of the free acid per mol of herbicidal salt may be used, and, advantageously, between about 0.01 and 0.5 mol of the acid per mol of amidoamine compound or herbicidal salt.

The new herbicidal compositions may be applied to vegetated areas in any suitable fashion known to the art. This includes application by misting, spraying, dusting or the like. However, as previously indicated, the new herbicidal concentrates are especially effective for the production of water-in-oil emulsions which may be applied with sling-spray dispersing equipment designed to distribute the herbicidal emulsion as large drops which cannot be easily spread by air currents to adjacent areas. Emulsions containing 5 to 15 gallons of water per gallon of herbicidal concentrate, as previously described, have been found particularly satisfactory.

CONCLUSION

As a result of the invention described herein, there are provided new herbicidal compositions which contain herbicidal acids, particularly aryloxy alkane carboxylic acids, as the effective herbicidal ingredient. These improvements in herbicidal compositions are founded upon the discovery of some new herbicidal amide and amide salts formed from certain amidoamine compounds containing salt-forming amino groups and the herbicidal acids and also upon the discovery of the solubilizing effect of certain amides upon herbicidal acids. Thus, not only are these amides and salts soluble in low cost hydrocarbon solvents even in concentrated amounts at all temperatures above their liquefication points, but also they have the ability to dissolve or solubilize very substantial quantities of the herbicidal acids. The resulting herbicidal compositions contain herbicidal agents which are of low volatility that may be applied to vegetated areas without creating problems of "drifting" to adjacent areas. Consequently, the invention provides a practical solution to the problem of continued use of herbicides derived from aryloxy alkane carboxylic acids in those political subdivisions where legislation has been passed prohibiting the use of esters of these herbicidal acids or other herbicides which are not free of drifting problems.

I claim:
1. A herbicidal composition comprising:
   (A) a liquid hydrocarbon solvent having dissolved therein,
   (B) the equivalent of at least about 1 pound of herbicidal polychlorophenoxyacetic acid per gallon of solution as material selected from the group consisting of,
      (a) free herbicidal polychlorophenoxyacetic acid solubilized in said hydrocarbon solvent by the presence of amide of an alkylene polyamine and a monocarboxylic acid containing between 6 to 24 carbon atoms, and

(b) the salt of herbicidal polychlorophenoxyacetic acid with amide of an alkylene polyamine and a monocarboxylic acid containing between 6 and 24 carbon atoms, and (c) the amide of herbicidal polychlorophenoxyacetic acid and an alkylene polyamine.

2. A viscous herbicidal emulsion comprising water as the dispersed phase and a herbicidal composition as claimed in claim 1 as the continuous phase.

3. A herbicidal composition comprising:
(A) diesel fuel having dissolved therein in an amount at least about 2 pounds per gallon of solution,
(B) the salt of herbicidal trichlorophenoxyacetic acid and tall oil fatty acid amide of diethylene triamine.

4. A herbicidal composition which may be mixed with water to form viscous herbicidal water-in-oil emulsions which comprises:
(A) diesel fuel, and
(B) an amide salt of the formula:

$$RCONH-C_2H_4-\underset{\underset{OCOCH_2OAr}{|}}{N}-C_2H_4-NHCOR$$

wherein:
R is alkyl radical portion of tall oil fatty acid, and
Ar is polychlorophenyl,
(C) said amide salt being dissolved in said diesel fuel in an amount between about 80 and 200 parts of the amide salt per 20 parts of diesel fuel.

5. A herbicidal composition as claimed in claim 1 wherein said alkylene polyamine is alkylene diamine.

6. A herbicidal composition as claimed in claim 1 wherein said monocarboxylic acid is tall oil fatty acid.

7. A herbicidal composition as claimed in claim 1 wherein said monocarboxylic acid is oleic acid.

8. A herbicidal composition as claimed in claim 1 wherein said monocarboxylic acid is 2,4,5-trichlorophenoxyacetic acid.

9. A herbicidal composition in the form of a non-aqueous liquid concentrate that may be mixed with water to form a viscous water-in-oil emulsion useable in the sling spray method of herbicide application to control growth of vegetation in selected areas without problem of drift to adjacent areas which comprises:
(A) a herbicidal salt of:
(a) a herbicidal aryloxyalkane monocarboxylic acid, and
(b) an amide of an alkylene polyamine and a monocarboxylic acid containing 6 to 24 carbon atoms, which amide contains a salt-forming amino group,
(B) free herbicidal aryloxyalkane monocarboxylic acid, and
(C) liquid hydrocarbon in which said herbicidal salt (A) and said free herbicidal acid (B) are completely dissolved forming a clear solution.

10. A herbicidal composition which may be mixed with water to form a viscous water-in-oil emulsion useable to control growth of vegetation in selected areas without problem of drift to adjacent areas which comprises a solution of a salt of a herbicidal aryloxyalkane monocarboxylic acid with a fatty acid amide of a polyalkylene polyamine in a liquid hydrocarbon solvent.

11. A herbicidal composition which may be mixed with water to form a viscous water-in-oil emulsion that may be used as a herbicide to control growth of vegetation in selected areas without problem of drift to adjacent areas which comprises a solution of a salt of herbicidal polychlorophenoxyacetic acid and oleyl diethylene triamine dissolved in diesel fuel.

12. A method of preparing a liquid herbicidal composition containing herbicidal carboxylic acid which comprises reacting a herbicidal aryloxyalkane monocarboxylic acid with an amide of an alkylene polyamine and an aliphatic monocarboxylic acid containing 6 to 24 carbon atoms to form a salt between said acid and said amide, adding to said salt additional free acid selected from the group consisting of herbicidal aryloxyalkane monocarboxylic acids and fatty acids and adding a liquid hydrocarbon solvent to the resulting mixture to create a clear viscous herbicidal composition that may be mixed with water to form a viscous water-in-oil emulsion useable in vegetation growth control.

13. A method as claimed in claim 12 wherein said herbicidal acid is a polychlorophenoxyacetic acid and said additional free acid is a fatty acid.

14. A method as claimed in claim 13 wherein said fatty acid is tall oil fatty acid.

15. A method as claimed in claim 12 wherein said additional free acid is a fatty acid added in sufficient amount to substantially reduce the viscosity of the herbicidal composition.

16. A method as claimed in claim 15 wherein said amount of fatty acid added to said salt is between about 0.01 and 1 mol of fatty acid per mol of said salt.

17. A herbicidal composition in the form of a non-aqueous liquid concentrate that may be mixed with water to form a viscous water-in-oil emulsion useable in the sling spray method of herbicide application to control growth of vegetation in selected areas without problem of drift to adjacent areas which comprises:
(A) a water-insoluble herbicidal salt of herbicidal polychlorophenoxyacetic acid and an amide having the formula:

$$-R_1CONHH-A-NH-Z-\underset{\underset{R_3}{|}}{N}-R_2$$

wherein:
$R_1$ is an organic radical containing from 5 to 23 carbon atoms selected from the group consisting of alkyl, alkenyl, cycloalkyl and aryl radicals,
$R_2$ is a radical selected from the group consisting of hydrogen and $R_4-$,
$R_3$ is a radical selected from the group consisting of hydrogen and 1 to 20 carbon atom alkyl and alkenyl radicals,
$R_4$ is a radical selected from the group consisting of $R_1CO-$ and $R_h-$,
$R_h$ is the acyl radical of a herbicidal aryloxyalkane monocarboxylic acid,
A is a divalent organic radical selected from the group consisting of alkylene, cycloalkylene and arylene radicals,
Z is a divalent organic radical selected from the group consisting of $-A-$, and $$-(A-\underset{\underset{R_3}{|}}{N}-)_n$$

and $n$ is a positive integer 1 through 6,
(B) free herbicidal polychlorophenoxyacetic acid,
(C) liquid hydrocarbon solvent having a boiling point above about 100° C., said components (A) and (B) being dissolved in said liquid hydrocarbon solvent to give a solution containing the equivalent of at least 1 pound per gallon of solution of herbicidal polychlorophenoxyacetic acid, and
(D) free fatty acid containing 10 to 18 carbon atoms in an amount between about 0.01 to 1 mol of said free fatty acid per mol of component (A).

18. A herbicidal composition in the form of a non-aqueous liquid concentrate that may be mixed with water to form a viscous water-in-oil emulsion useable in the sling spray method of herbicidal application to control growth of vegetation in selected areas without problem of drift to adjacent areas which comprises:
(A) the water-insoluble herbicidal salt of:
(a) 2,4,5-trichlorophenoxyacetic acid, and
(b) the monoamide of soya oil fatty acid and ethylene diamine, (B) oleic acid, and
(C) diesel fuel,
(D) the components (A), (B) and (C) being present in the composition in parts by weight ratio A:B:C of about 50:50:10 giving a viscous solution which remains clear at room temperature.

References Cited by the Examiner

UNITED STATES PATENTS

| | | | |
|---|---|---|---|
| 2,396,513 | 6/1945 | Jones | 71—2.6 |
| 2,515,198 | 7/1950 | Dosser et al. | 71—2.6 |
| 2,694,625 | 11/1954 | Warren | 71—2.6 |
| 2,900,411 | 8/1959 | Harwood | 71—2.6 XR |

LEWIS GOTTS, *Primary Examiner.*

JAMES O. THOMAS, JR., *Examiner.*

A. J. ADAMCIK, *Assistant Examiner.*